United States Patent

[11] 3,589,662

| | | |
|---|---|---|
| [72] | Inventor | Henri Lagrange<br>Billancourt, France |
| [21] | Appl. No. | 786,661 |
| [22] | Filed | Dec. 24, 1968 |
| [45] | Patented | June 29, 1971 |
| [73] | Assignees | Regie Nationale Des Usines Renault<br>Billancourt, ;<br>Automobiles Peugeot<br>Paris, France |
| [32] | Priority | Jan. 23, 1968 |
| [33] | | France |
| [31] | | 137,073 |

[54] SAFETY REARVIEW MIRROR MOUNTINGS
3 Claims, 8 Drawing Figs.

[52] U.S. Cl. .................................................. 248/475,
24/214, 248/223
[51] Int. Cl. .................................................. B60r 1/04
[50] Field of Search .......................................... 248/475,
476, 479, 481—484, 223, 225, 204; 24/208,
208.3, 213, 214, 220; 287/20, 20.5, 23

[56] References Cited
FOREIGN PATENTS

| 1,084,850 | 9/1967 | Great Britain................ | 248/475 |
| 1,246,937 | 10/1960 | France ......................... | 248/475 |

OTHER REFERENCES

GERMAN PRINTED APPLICATION: Herr et al., Serial No. H25898II/63C, 5-1956, Class 248–475 1 sht. drwg., 2 pp. spec.

Primary Examiner—Roy D. Frazier
Attorney—Stevens, Davis, Miller & Mosher

ABSTRACT: A fastening device applicable more particularly to rearview mirrors of automotive vehicles, characterized in that it comprises two members, one of relatively rigid material and the other of resilient material, which are secured the one to the rearview mirror arm and the other to the vehicle body, said members comprising elements permitting their mutual engagement by flexion of said resilient member and their disengagement when a certain force or a shock is applied to the member carrying the rearview mirror.

PATENTED JUN29 1971    3,589,662
SHEET 1 OF 2
FIG. 1
FIG. 2
FIG. 3
FIG. 4
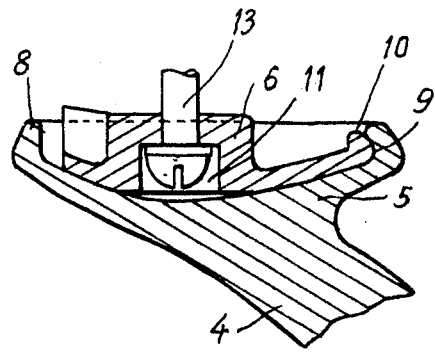
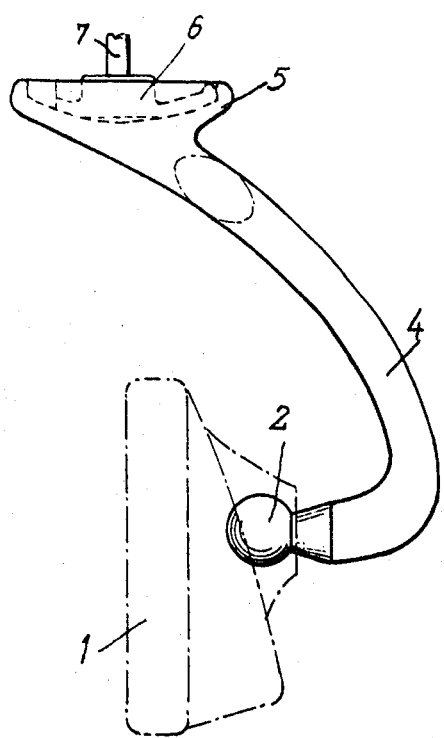
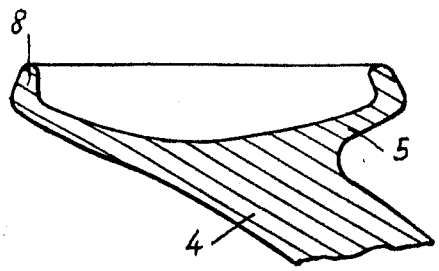
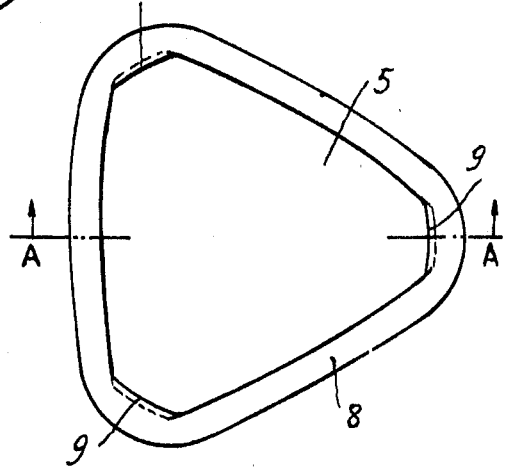

SAFETY REARVIEW MIRROR MOUNTINGS

This invention relates in general to a fastening device applicable more particularly to a rearview mirror, notably an interior mirror of automotive vehicle which is of the safety type adapted to be knocked off when a certain force is applied thereto, for instance in case of a shock.

Many fastening systems or mountings have already been proposed which permit the ejection of a rearview mirror when a certain stress is exerted thereon. As a rule, these known devices re relatively complicated and of questionable efficiency, so that they cannot be regarded as definitely reliable. It is the essential object of this invention to avoid the inconveniences set forth hereinabove by providing a knockoff or breakoff rearview mirror characterized essentially in that it consists of two members, one member carrying the rearview mirror and the other member being fastened to the vehicle body, these members being in mutual engagement, one relatively resilient or flexible and the other relatively rigid, so that they can be assembled by flexure distortion of the resilient member, their mutual disengagement and the ejection of the rearview mirror resulting from the application of a certain force or of a shock exerted against the mirror-supporting member.

The fitting effort is as a rule of the same order of magnitude as the ejection effort, and sometimes the former is superior to the latter. It is a specific feature of this invention that the resilient or flexible member has a part spherical or tapered configuration, thus providing in a simple yet efficient manner the difference between the fitting effort and the knockoff or ejection effort.

In the attached drawing:

FIG. 1 illustrates in side elevational view a rearview mirror comprising a two-element mounting according to this invention;

FIG. 2 is a fragmentary section showing on a larger scale a detail of a specific form of embodiment of the mounting device given by way of example;

FIG. 3 and 4 are a plane view from above and a part sectional view according to FIG. 2, taken along the line A-A of FIG. 3, respectively, of one of the component elements of the device of FIG. 1;

Figure 6:
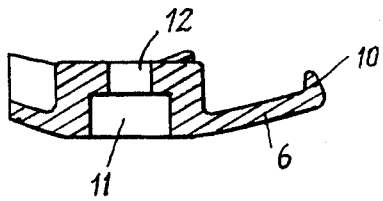
Figure 5:
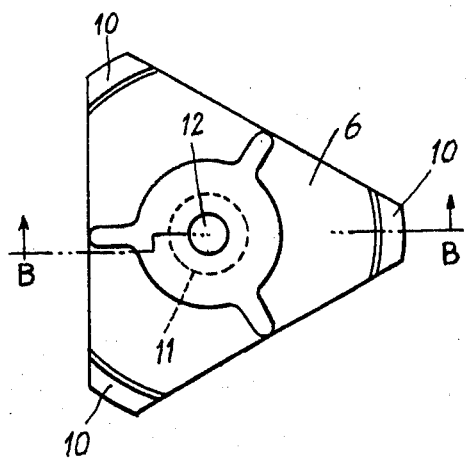
Figure 7:
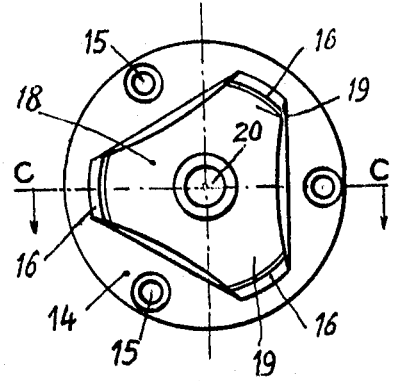
Figure 8:
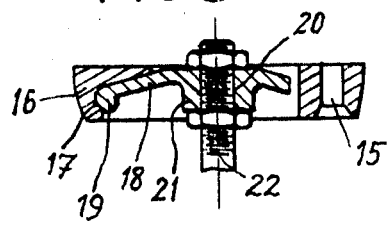

FIG. 5 and 6 are views corresponding to FIGS. 3 and 4, respectively, but concerning the other element of the device, the section being taken along the line B-B of FIG. 5; and FIGS. 7 and 8 are half view in plane and a section taken along the line C-C of FIG. 7, respectively, concerning a modified form of embodiment of the fastening device.

Referring to the drawing and more particularly to FIG. 1, it will be seen that the rearview mirror 1 is a swivel mounted on a ball 2 rigid with an arm 4 carrying at its opposite end a dished or cap member 5 constituting the first component member of the fastening device which is engaged by the other member 6 secured to the vehicle body, the first member being detachable from the second one in case of a shock; the second member 6 is secured toe the body by a single screw 7. One member has a sufficient flexibility and the other is more rigid.

In the specific form of embodiment of the mounting device illustrated in FIG. 2 the female member 5 is a relatively rigid material and carried by said arm 4; it has a cup-shaped configuration as shown in detail in FIGS. 3 and 4; the cup 5 has substantially the shape of an equilateral triangle with rounded and convex sides, and rounded vertices. A peripheral rib 8 formed with three inner grooves 9 permits the assembly of this member with the other member as will be explained presently.

The other or male member 6 of the assembly consists of a resilient material and is shown in detail in FIGS. 5 and 6; it has substantially the shape of an equilateral triangle with rounded vertices 10 adapted to engage the aforesaid grooves 9 of member 5. Centrally of this member 6 is a projecting boss formed with a cavity 11 and a hole 12 permitting the passage of a screw 13 for fastening the member 6 to the vehicle body; thus, the screwhead is recessed completely into said cavity 11.

It will be readily understood that the two members 5 and 6 are assembled very easily on account of the particular shape of member 5 which will be retained by the other member 6 due to the engagement of the notches 9 of the former over the vertices 10 of the latter, as a consequence of the flexion imparted to the arms of member 6.

However, it is clear that the functions of these two members may be reversed, if desired, as shown in FIGS. 7 and 8; in this case the female member 14 of semirigid plastic material or even rigid material has a circular configuration with passages 15 for the screws for fastening same to the windscreen frame structure, and three peripheral bosses 16 in this assembly which provide each a groove 17; the other member 18, made of resilient material, has substantially the shape of an equilateral triangle with rounded vertices 19 adapted detachably to engage said grooves 17; the central orifice 20 permit the fastening thereof to the arm 22 of rearview mirror 1.

Of course, the forms of embodiment described hereinabove and illustrated in the accompanying drawing should not be construed as limiting the present invention since many modifications and variations may be brought thereto without departing from the spirit and scope of the invention, as set forth in the appended claims. Thus, this invention is considered basically as comprising fastening or mounting devices consisting of two members of which one is relatively flexible and the other more rigid, these two members being detachably assembled by utilizing to this end the greater flexibility of one member so as to create an asymmetry between the fitting and knockoff efforts.

I claim:

1. A safety device for securing a rear viewer of a vehicle comprising a two elements, the first element made of a relatively rigid material, the second element being made of a flexible material, one of said elements forming a part of an arm to support the rear viewer, the other element being associated with the body of the vehicle, the engagement of said two elements one within the other being effected by flexing of the flexible element, the disengagement thereof being possible as a result of an impact applied to the element supporting the rear viewer, characterized in that the contact surface of said elements is concavo-convex, the first element being constituted of a member having an equilateral triangular shape wherein the rounded off vertices from engaging teeth, the second element having a shape corresponding to said first element, the edging thereof forming a rib, the vertices of which provide notches being adapted to engage the first element.

2. The device defined in claim 1 said second element having a second member, said second member being formed with a central boss having a cavity and a hole formed therethrough for receiving a screw by which said second member is adapted to be secured to the vehicle body.

3. A modified form of the fastening device defined by claim 1, characterized in that said first element is secured to the vehicle body and of circular configuration with peripheral bosses each formed with a groove, said second element having substantially the shape of an equilateral triangle with rounded vertices adapted to engage the grooves of the first element, and said first element being formed with a central orifice engageable by the relevant end of the rearview mirror arm.